United States Patent
Minematsu (10) Patent No.: US 11,336,456 B2
(45) Date of Patent: May 17, 2022

(54) MESSAGE AUTHENTICATION SYSTEM, APPARATUS, AND MESSAGE VERIFICATION METHOD

(71) Applicant: NEC Corporation, Tokyo (JP)

(72) Inventor: Kazuhiko Minematsu, Tokyo (JP)

(73) Assignee: NEC CORPORATION, Tokyo (JP)

(*) Notice: Subject to any disclaimer, the term of this patent is extended or adjusted under 35 U.S.C. 154(b) by 278 days.

(21) Appl. No.: 16/468,768

(22) PCT Filed: Dec. 15, 2016

(86) PCT No.: PCT/JP2016/087405
§ 371 (c)(1),
(2) Date: Jun. 12, 2019

(87) PCT Pub. No.: WO2018/109906
PCT Pub. Date: Jun. 21, 2018

(65) Prior Publication Data
US 2020/0076611 A1 Mar. 5, 2020

(51) Int. Cl.
*H04L 29/06* (2006.01)
*H04L 9/32* (2006.01)
(Continued)

(52) U.S. Cl.
CPC .......... *H04L 9/3242* (2013.01); *H04L 9/0643* (2013.01); *H04L 9/3247* (2013.01);
(Continued)

(58) Field of Classification Search
CPC ............. H04L 2209/34; H04L 2209/80; H04L 63/123; H04L 9/0643; H04L 9/3242; H04L 9/3247; H04W 12/06
See application file for complete search history.

(56) References Cited

U.S. PATENT DOCUMENTS 6,845,449 B1   1/2005 Carman et al.
7,630,402 B2  12/2009 Un et al.
(Continued)

FOREIGN PATENT DOCUMENTS

EP    1255372 A1 * 11/2002   .......... H04L 9/3242
JP   2008278416 A    11/2008
(Continued)

OTHER PUBLICATIONS

Morris Dworkin et al., "Recommendation for Block Cipher Modes of Operation: The CMAC Mode for Authentication", National Institute of Standards and Technology, May 2005, pp. 1-16 (21 pages total).

(Continued)

*Primary Examiner* — J. Brant Murphy
*Assistant Examiner* — Ka Shan Choy
(74) *Attorney, Agent, or Firm* — Sughrue Mion, PLLC (57) ABSTRACT

A first apparatus comprises an error correction coding part that receives a message M to be transmitted to a second apparatus, performs coding using a predetermined error correction code, and outputs a codeword C; a message authentication tag generation part that receives the message M and outputs a predetermined message authentication tag T; and a transmission part that transmits the codeword C and the tag T as transmission information S to the second apparatus. The second apparatus receives a message M* to be verified and a tag T', which are obtained from the transmission information S, and determines that the message M* to be verified has not been tampered with when a tag T* obtained from the message M* to be verified and the tag T' satisfy a predetermined identity criterion.

9 Claims, 9 Drawing Sheets

(51) Int. Cl.
*H04L 9/06* (2006.01)
*H04W 12/06* (2021.01)

(52) U.S. Cl.
CPC ......... *H04L 63/123* (2013.01); *H04W 12/06* (2013.01); *H04L 2209/80* (2013.01)

(56) References Cited

U.S. PATENT DOCUMENTS

| | | | |
|---|---|---|---|
| 7,921,284 B1* | 4/2011 | Kinghorn | H04L 63/20 713/160 |
| 8,320,350 B2 | 11/2012 | Messerges et al. | |
| 2004/0083368 A1* | 4/2004 | Gehrmann | H04L 9/0841 713/171 |
| 2007/0140259 A1* | 6/2007 | Mouffron | H04L 1/0061 370/395.32 |
| 2007/0160082 A1 | 7/2007 | Un et al. | |
| 2009/0080389 A1 | 3/2009 | Messerges et al. | |
| 2009/0097637 A1* | 4/2009 | Boscher | H04L 9/3066 380/28 |
| 2009/0276677 A1* | 11/2009 | Saito | H04L 1/0061 714/750 |
| 2013/0145236 A1* | 6/2013 | Baker | H03M 13/6527 714/776 |
| 2016/0330032 A1* | 11/2016 | Naim | G06F 13/4282 |

FOREIGN PATENT DOCUMENTS

| | | | | |
|---|---|---|---|---|
| JP | 2015204508 A | | 11/2015 | |
| WO | WO-2015102694 A2 | * | 7/2015 | ........... H04L 9/0852 |

OTHER PUBLICATIONS

Mihir Bellare et al., "Keying Hash Functions for Message Authentication", Jun. 1996, pp. 1-19 (19 pages total) [online], [searched on Nov. 28, 2016], the Internet <URL: http://cseweb.ucsd.edu/~mihir/papers/kmd5.pdf>.

Elena Dubrova et al., "Error-Correcting Message Authentication for 5G", Ericsson Research, (10 pages total) [online], [searched on Nov. 28, 2016], the Internet <URL: https://www.ericsson.com/res/docs/2016/error-correcting-message-authentication-for-5g.pdf>.

Charles C.Y. Lam et al., "Message Authentication Codes with Error Correcting Capabilities", 4th International Conference, ICICS 2002, Jun. 20, 2002, pp. 1-16 (16 pages total).

Written Opinion of the International Searching Authority dated Mar. 21, 2017, in counterpart International Application No. PCT/JP2016/087405.

International Search Report dated Mar. 21, 2017, in counterpart Intentional Application No. PCT/JP2016/087405.

\* cited by examiner

MESSAGE AUTHENTICATION SYSTEM, APPARATUS, AND MESSAGE VERIFICATION METHOD

This application is a National Stage Entry of PCT/JP2016/087405 filed on Dec. 15, 2016, the contents of all of which are incorporated herein by reference, in their entirety.

FIELD

The present invention relates to a message authentication system, apparatus, and message verification method, and particularly to a message authentication system, apparatus, and message verification method having an error correction function using an error correction code.

BACKGROUND

Message Authentication Code (MAC) is a technology that guarantees that a message is valid by adding a tag that only one who knows a secret key can calculate to the message. For instance, by using message authentication, one is able to detect tampering by a third party performed during communication between two parties sharing a secret key. Specifically, when K is a secret key shared by the sender and receiver of a message and M is the message, the sender sends a tag T=MAC (K, M) to the receiver along with the message M. Note that MAC (K, M) indicates a function F that receives M and K, and outputs the tag T.

The message and tag received by the receiver via a communication channel are denoted as message M' and tag T', respectively. The receiver who has received the message M' and the tag T' calculates a tag T" using the received message M' and the key K shared with the sender. Here, the receiver is able to determine whether or not the message M' is sent from a valid sender by confirming whether or not the received tags T' matches the tag T".

Examples of such methods include Cipher-based Message Authentication Code (referred as "CMAC" hereinafter) of Non-Patent Literature 1 (NPL1) and Hash-based Message Authentication Code (referred as "HMAC" hereinafter) of Non-Patent Literature 2 (NPL2).

Meanwhile, since errors may occur due to natural factors in communication, an error-correcting code (referred to as "ECC" hereinafter) is usually applied. At this time, the error correction code is normally applied to the entire content of the communication. Therefore, when message authentication is used, an error correction code encoding process is performed on the entire sequence (M||T) in which the message M and the tag T=MAC (M) are concatenated ("||" indicates a concatenation operator).

When encoding processing on an arbitrary binary sequence x is g(x), the transmitted content is g(M||MAC (M)). The receiver first performs error correction processing and performs MAC verification processing on the obtained estimated value of (M||T).

Non-Patent Literature 3 (NPL3) [DNSN], Non-Patent Literature 4 (NPL4) [LGV], and Patent Literature 1 (PTL1) propose methods that combines message authentication and error correction code functions described above.

PTL 1
Japanese Patent Kokai Publication No. JP2015-204508A
NPL 1
NIST Special Publication 800-38B, "Recommendation for Block Cipher Modes of Operation: The CMAC Mode for Authentication," [online], [searched on Nov. 28, 2016], the Internet <URL: http://nvlpubs.nist.gov/nistpubs/SpecialPublications/NIST.SP.800-38b.pdf>
NPL 2
Bellare, Mihir, Canetti, Ran and Krawczyk, Hugo, "Keying Hash Functions for Message Authentication," [online], [searched on Nov. 28, 2016], the Internet <URL: http://cseweb.ucsd.edu/~mihir/papers/kmd5.pdf>
NPL 3
Dubrova, Elena, Naslund, Mats, Selander, Goran, and Norrma, Karl, "Error-Correcting Message Authentication for 5G," [online], [searched on Nov. 28, 2016], the Internet <URL: https://www.ericsson.com/res/docs/2016/error-correcting-message-authentication-for-5g.pdf>
NPL 4
Lam, C. Y., Gong, G., Vanstone, S. A., "Message Authentication Codes with Error Correcting Capabilities," 4th International Conference, ICICS 2002, Jun. 20, 2002, [online], [searched on Nov. 28, 2016], the Internet <URL: http://cacr.uwaterloo.ca/techreports/2002/corr2002-19.ps>

SUMMARY

The following analysis is given by the present invention. As described above, when message authentication code (MAC) and error correction code (ECC) are combined, error correction code encoding processing is performed on the entire sequence (M||T) in which the message M and the tag T=MAC(M) are concatenated (refer to paragraphs 0065 and 0110 to 0111 in Patent Literature 1). Normally, since an error correction code function is built into the hardware of a communication device and message authentication is often performed outside of the communication device, typically by software, the restriction on the process order described above will not be an issue.

For instance, however, error correction for packets supplied to or outputted from storage is performed by software. In this case, since message authentication and error correction (ECC) will be separately performed by software, improvement of the processing speed can be hindered.

Further, the tag used for message authentication described above is relatively small data of a fixed length (for instance between 32 bits and 128 bits), and since the message is sufficiently longer than the tag in a typical Internet packet, there will be no problem.

However, in applications such as sensor networks using low-power wireless communication represented by IoT (Internet of Things), the amount of power required for transmission per bit is relatively large. For this reason, applications are often designed to have very short messages. As a result, when an existing message authentication method is used, the length of a message is expected to be the same as that of a tag or shorter. These overheads for the message body can be a power consumption increasing factor that cannot be ignored in low-power wireless communication.

Regarding the above points, Non-Patent Literature 3 [DNSN] proposes a message authentication method combined with single-bit error correction, but does not realize a combination of an arbitrary message authentication code and an arbitrary error correction code. Further, Non-Patent Literature 4 [LGV] describes the construction of a message authentication code having an error correction function, and does not realize a combination of an arbitrary message authentication code and an arbitrary error correction code, either.

It is an object of the present invention to provide a message authentication system, apparatus, and message verification method that eliminate restrictions on the process order when an arbitrary message authentication code and an arbitrary error correction code are used, thereby making it possible to increase the processing speed, and that can contribute to reducing overheads.

According to a first aspect, there is provided a message authentication system including a first apparatus and a second apparatus. The first apparatus comprises a processor configured to execute program instructions to: receive a message M to be transmitted to a second apparatus, perform coding using a predetermined error correction code, and output a codeword C; receive the message M and output a predetermined message authentication tag T; and transmit the codeword C and the tag T as transmission information S to the second apparatus. The second apparatus comprising: a processor configured to execute program instructions to: extract a codeword C' and a tag T' corresponding to the codeword C and the tag T from the transmission information S received from the first apparatus; decode the predetermined error correction code for the codeword C' and output a message M* to be verified; and receive the message M* to be verified and the tag T', and determine that the message M* to be verified has not been tampered with when a tag T* obtained from the message M* to be verified and the tag T' satisfy a predetermined identity criterion.

According to a second aspect, there is provided a first apparatus and a second apparatus that constitute the message authentication system described above.

According to a third aspect, there is provided a message verification method including extracting a codeword C' and a tag T' corresponding to a codeword C and a tag T from transmission information S received from a first apparatus that transmits the codeword C and the tag T as the transmission information S to a second apparatus; decoding the predetermined error correction code for the codeword C' and outputting a message M* to be verified; and receiving the message M* to be verified and the tag T', and determining that the message M* to be verified has not been tampered with when a tag T* obtained from the message M* to be verified and the tag T' satisfy a predetermined identity criterion. The present method is tied to a particular machine, namely, an apparatus having functions of performing error correction processing for the codeword C' in the transmission information S and performing message verification using the message M*, a secret key K, and the received tag T'.

According to a fourth aspect, there is provided a nontransitory computer-readable storage medium that records a program executed by a computer built into each of the first and the second apparatuses constituting the message authentication system described above. Further, this program can be stored in a computer-readable (non-transient) recording medium. In other words, the present invention can be implemented as a computer program product.

The meritorious effects of the present invention are summarized as follows.

According to the present invention, it becomes possible to increase the processing speed and reduce overheads in communication using a message authentication code and an error correction code.

PREFERRED MODES

First, an outline of an exemplary embodiment of the present disclosure will be described with reference to the drawings. Note that drawing reference signs in the outline are given to each element as an example solely to facilitate understanding for convenience and are not intended to limit the present disclosure to the aspects shown in the drawings. Further, connection lines between blocks in the drawings used in the description below can be both bidirectional and unidirectional. Unidirectional arrows schematically indicate main flows of signals (data) and do not exclude bidirectionality.

Figure 1:
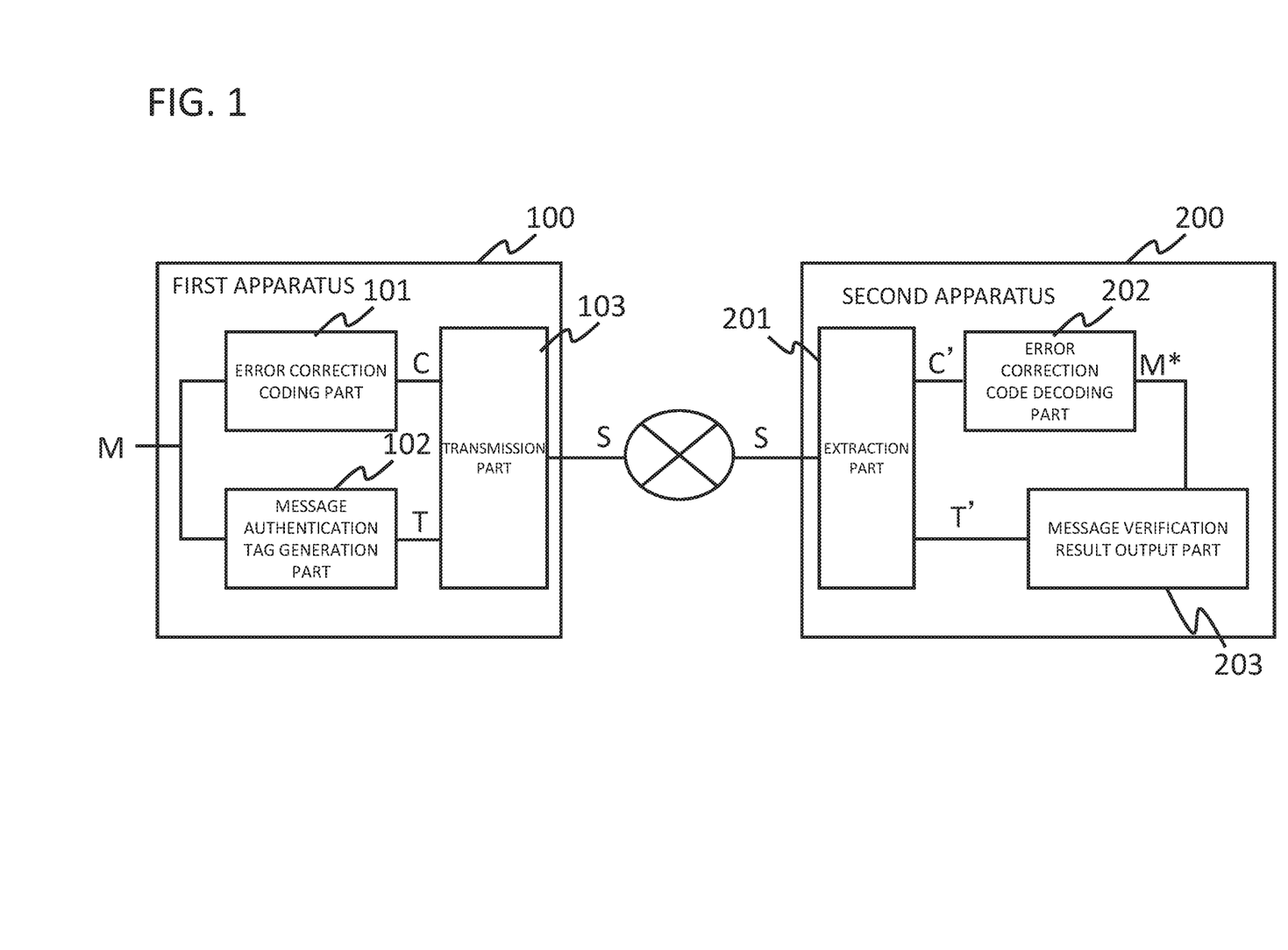
FIG. 1 is a drawing illustrating the configuration of an exemplary embodiment of the present disclosure.

The present disclosure in an exemplary embodiment thereof can be realized by a message authentication system that includes a first apparatus 100 and a second apparatus 200, as shown in FIG. 1. More specifically, the first apparatus 100 comprises an error correction coding part 101 that receives a message M to be transmitted to the second apparatus 200, performs coding by means of a predetermined error correction code, and outputs a codeword C; a message authentication tag generation part 102 that receives the message M and outputs a predetermined message authentication tag T; and a transmission part 103 that concatenates the codeword C and the tag T and transmits the result as transmission information S to the second apparatus 200.

The second apparatus 200 comprises an extraction part 201 that extracts a codeword C' and a tag T' corresponding to the codeword C and the tag T from the transmission information S received from the first apparatus 100; an error correction code decoding part 202 that decodes the predetermined error correction code with respect to the codeword C' and outputs a message M* to be verified; and a message verification result output part 203 that receives the message M* to be verified and the tag T', and determines that the message M* to be verified has not been tampered with when a tag T* obtained from the message M* to be verified and the tag T' satisfy a predetermined identity criterion.

Figure 2:
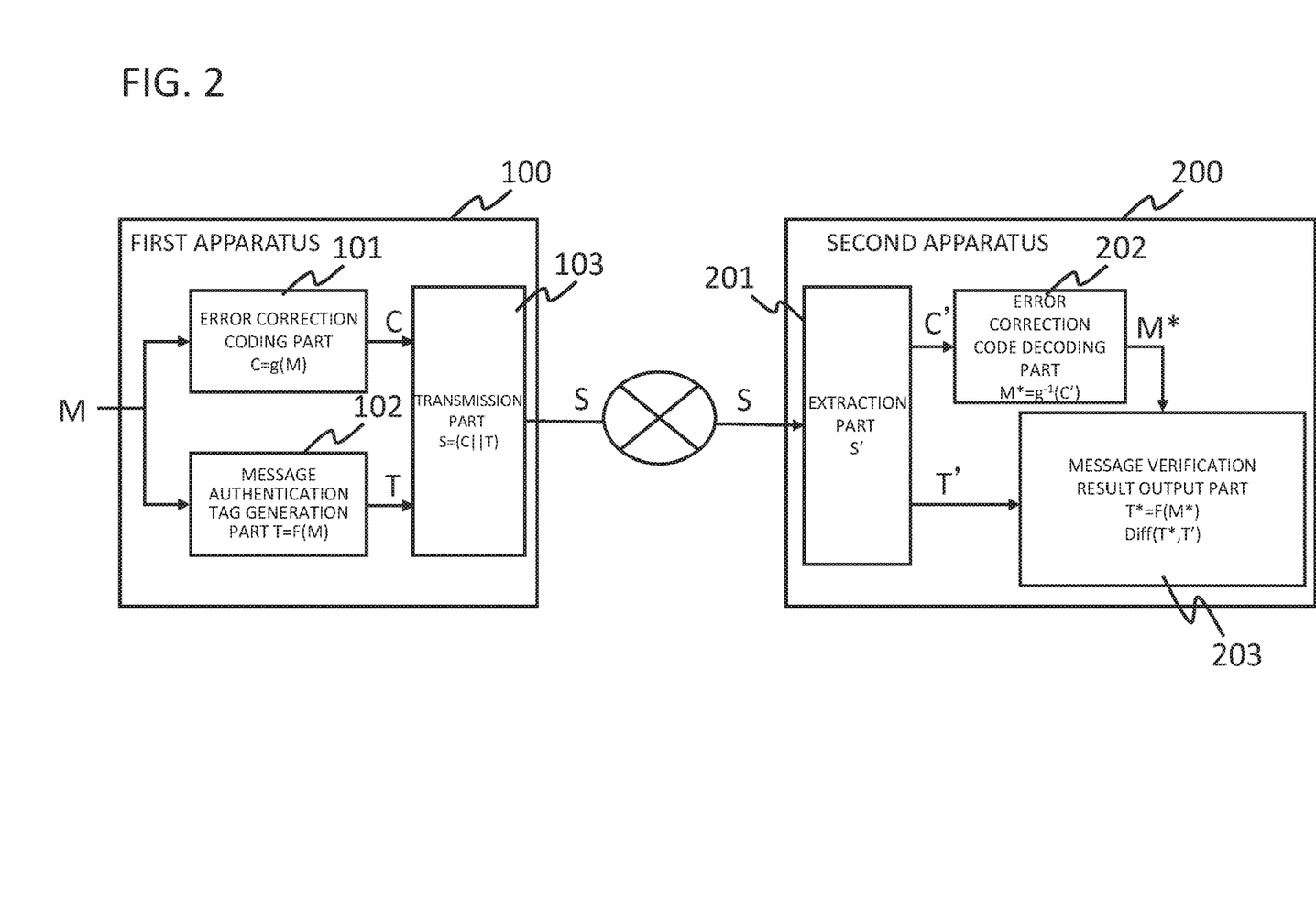
FIG. 2 is a drawing for explaining the operation of an exemplary embodiment of the present disclosure.

FIG. 2 is a drawing for explaining the operation of the message authentication system described above. When the first apparatus 100 receives the message M, the error correction coding part 101 and the message authentication tag generation part 102 starts to operate, calculate the codeword C and the tag T, respectively, and output the results to the transmission part 103. The transmission part 103 concatenates the codeword C and the tag T, and transmits the result as the transmission information S to the second apparatus 200. Note that, since the present exemplary embodiment does not have a restriction that the tag T must be calculated first, the operations of the error correction coding part 101 and the message authentication tag generation part 102 can be independently performed in parallel as shown in FIG. 2. Further, the codeword C and the tag T can be concatenated in various ways which should be determined in advance between the first and second apparatuses. For instance, the codeword C can be stored first in a predetermined transmission format, and the tag T can be stored thereafter. It goes without saying that this is not the only method, and various methods can be employed. For instance, the tag T may be stored in a header area of the transmission frame, or the concatenated data may be encrypted.

When receiving the transmission information S, the second apparatus 200 extracts the parts of the codeword C and the tag T (referred to as C' and T', respectively, since these are not guaranteed to be identical to the cord word C and the tag T at the time of extraction) from the transmission information S. Next, the second apparatus 200 decodes the codeword C' to obtain the message M* to be verified. For this the message M*, whether or not there has been tampering is not confirmed yet, however, errors occurred during the transmission process have been corrected. Then the second apparatus 200 uses the message M* as input and calculates the tag T* using a secret key shared in advance with the first apparatus 100. Further, when the tag T* and the tag T' extracted from the transmission information S received from the first apparatus 100 satisfy the predetermined identity criterion, the second apparatus 200 determines that the message M* to be verified has not been tampered with. Conversely, when the tag T* and the tag T' do not satisfy the predetermined identity criterion, the second apparatus 200 determines that the message M* to be verified has been falsified.

As described above, according to the present disclosure, since the error correction coding process and the process of calculating the tag T for message authentication can be performed independently, the processing speed of the transmitting apparatus can be improved. Further, according to the present disclosure, since the error correction coding process excludes the tag T (for instance, 32 to 128 bits in length), the amount of calculation and the amount of the data transmitted to the second apparatus 200 can be reduced (refer to FIG. 6).

Further, as the predetermined identity criterion, various methods for determining practical identity on the basis of the degree of similarity between two pieces of data can be employed. For instance, when a value (distance) indicating the amount of the difference between the tag T* and the tag T' is not greater than a predetermined threshold value, it can be determined that the message M* to be verified has not been falsified. Further, the threshold value can be set according to an expected error rate in the communication channel between the first apparatus 100 and the second apparatus 200 or the accuracy of the tampering detection function required for the communication between the first apparatus 100 and the second apparatus 200.

First Exemplary Embodiment

Figure 3:
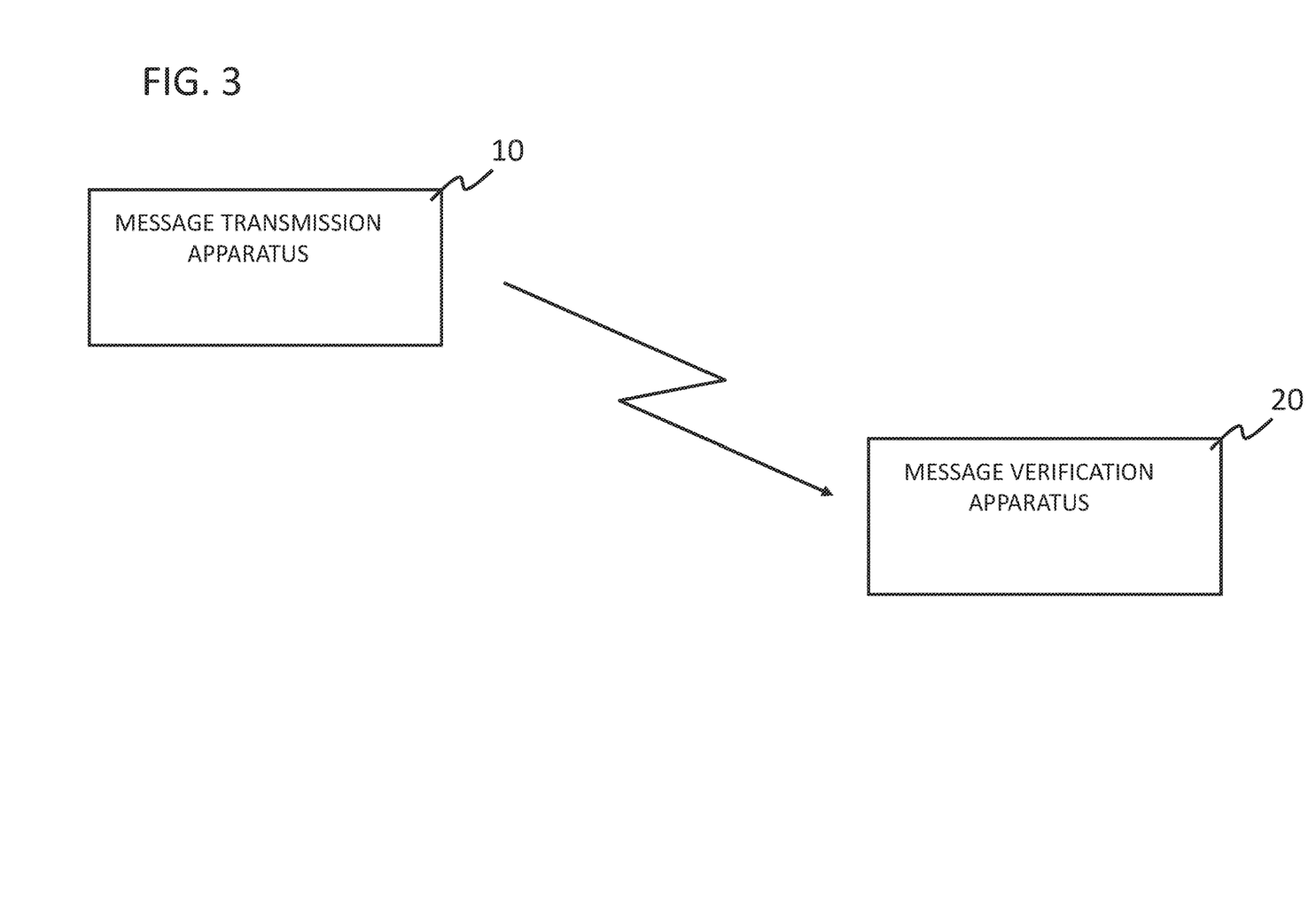
FIG. 3 is a drawing showing the configuration of a message authentication system according to a first exemplary embodiment of the present disclosure.

Next, a first exemplary embodiment of the present disclosure will be described in detail with reference to the drawings. In the following, it is assumed that the message M has m bits and the tag T has t bits unless otherwise noted. FIG. 3 is a drawing showing the configuration of a message authentication system according to the first exemplary embodiment of the present disclosure. FIG. 3 shows a message transmission apparatus 10 that transmits a tagged message, and a message verification apparatus 20 that verifies the tagged message received from the message transmission apparatus 10.

The message transmission apparatus 10 is an apparatus that transmits data, such as various wireless terminals and sensor terminals. The message verification apparatus 20 is an apparatus that receives data, such as a terminal or server that receives a message from the message transmission apparatus 10. The present exemplary embodiment assumes that the communication between the message transmission apparatus 10 and the message verification apparatus 20 is performed wirelessly, however, the message transmission apparatus 10 and the message verification apparatus 20 may be connected by a wire.

Figure 4:
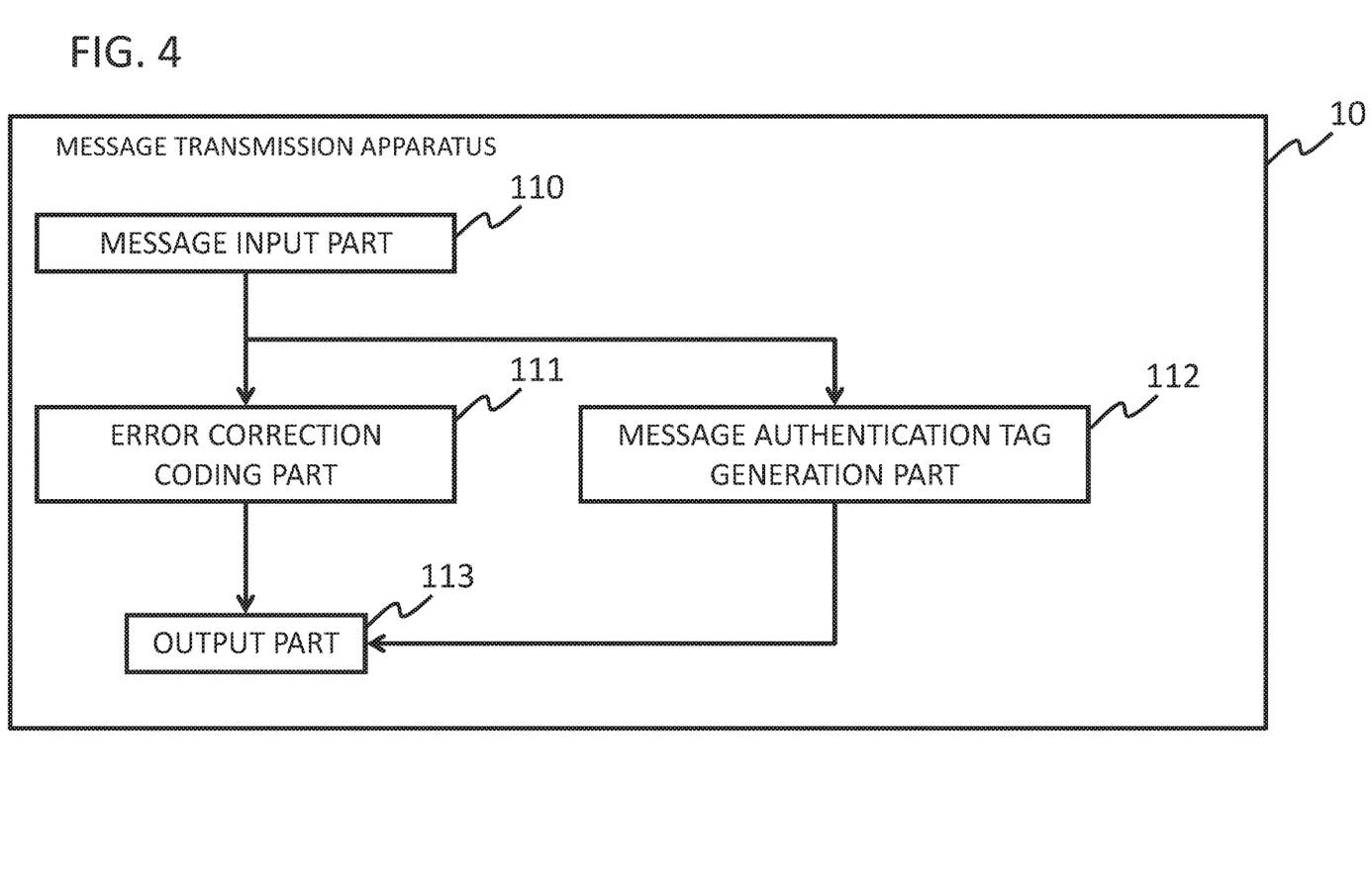
FIG. 4 is a drawing illustrating the configuration of a message transmission apparatus according to the first exemplary embodiment of the present disclosure.

First, the configuration of the message transmission apparatus 10 will be described. FIG. 4 is a block diagram illustrating the configuration of the message transmission apparatus 10. FIG. 4 shows a configuration comprising a message input part 110, an error correction coding part 111, a message authentication tag generation part 112, and an output part 113.

The message input part 110 receives the message M to be processed from a user and outputs it to the error correction coding part 111 and the message authentication tag generation part 112. Such message input part 110 is realized by, for instance, a character input device such as a keyboard or a communication unit that receives a message from the outside (for instance, refer to a communication device 930 and an input device 940 in FIG. 9).

The error correction coding part 111 applies a coding function of a predetermined error correction code to the message M, and outputs the codeword C as a result. Any error correction code may be used, including a Hamming code and a Reed-Solomon code. When the encoding function is g(x), the codeword C can be expressed as g(M).

The message authentication tag generation part 112 applies a tag generation function of a message authentication code using common key encryption to the message M, and outputs the tag T as a result. As the message authentication code, any message authentication code realizing a pseudo-random function such as CMAC (Non-Patent Literature 1) using a block cipher or HMAC (Non-Patent Literature 2) using a hash function can be used. When the tag generation function is F(x), the tag T can be expressed as F(M).

The output part 113 concatenates the codeword C outputted from the error correction coding part 111 and the tag T outputted from the message authentication tag generation part 112, and transmits the result to the message verification apparatus 20 as the transmission information S. The output part 113 can be constituted by a computer program that configures the transmission information S and transmits it to the message verification apparatus 20, and a communication unit that transmits a message.

Figure 9:
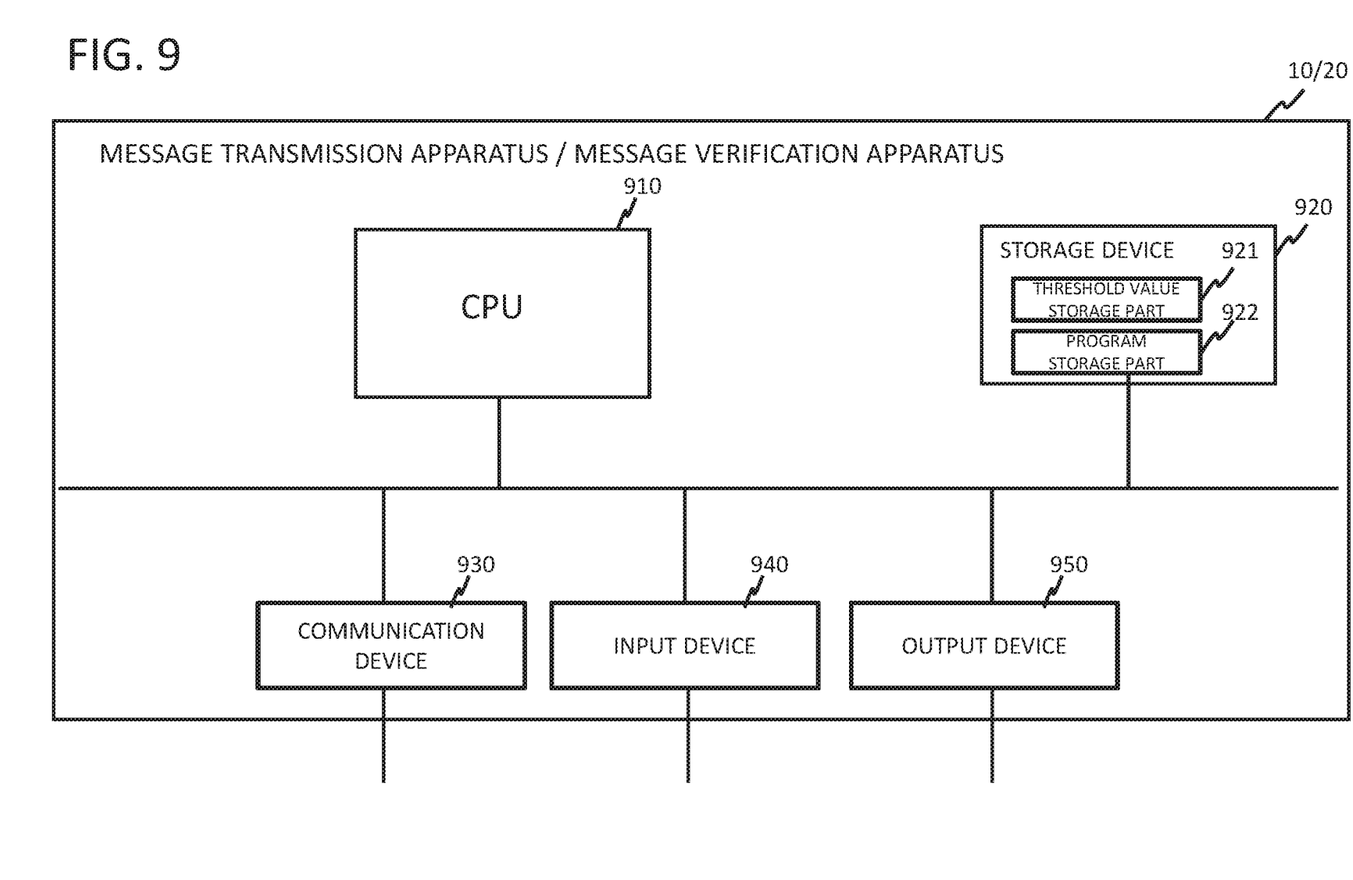
FIG. 9 is a drawing illustrating a hardware configuration of an apparatus constituting the message authentication system according to the first exemplary embodiment of the present disclosure.

The message transmission apparatus 10 described above can be realized by a computer comprising a CPU and a storage device (memory/disk) (refer to FIG. 9). Further, as shown in FIG. 9, each part of the message transmission apparatus 10 described above can be realized by storing in a storage device 920 a computer program that causes the CPU 910 to execute processes corresponding to each of the part above (refer to a program storage part 922 in FIG. 9) and by running this program on the CPU 910.

Figure 5:
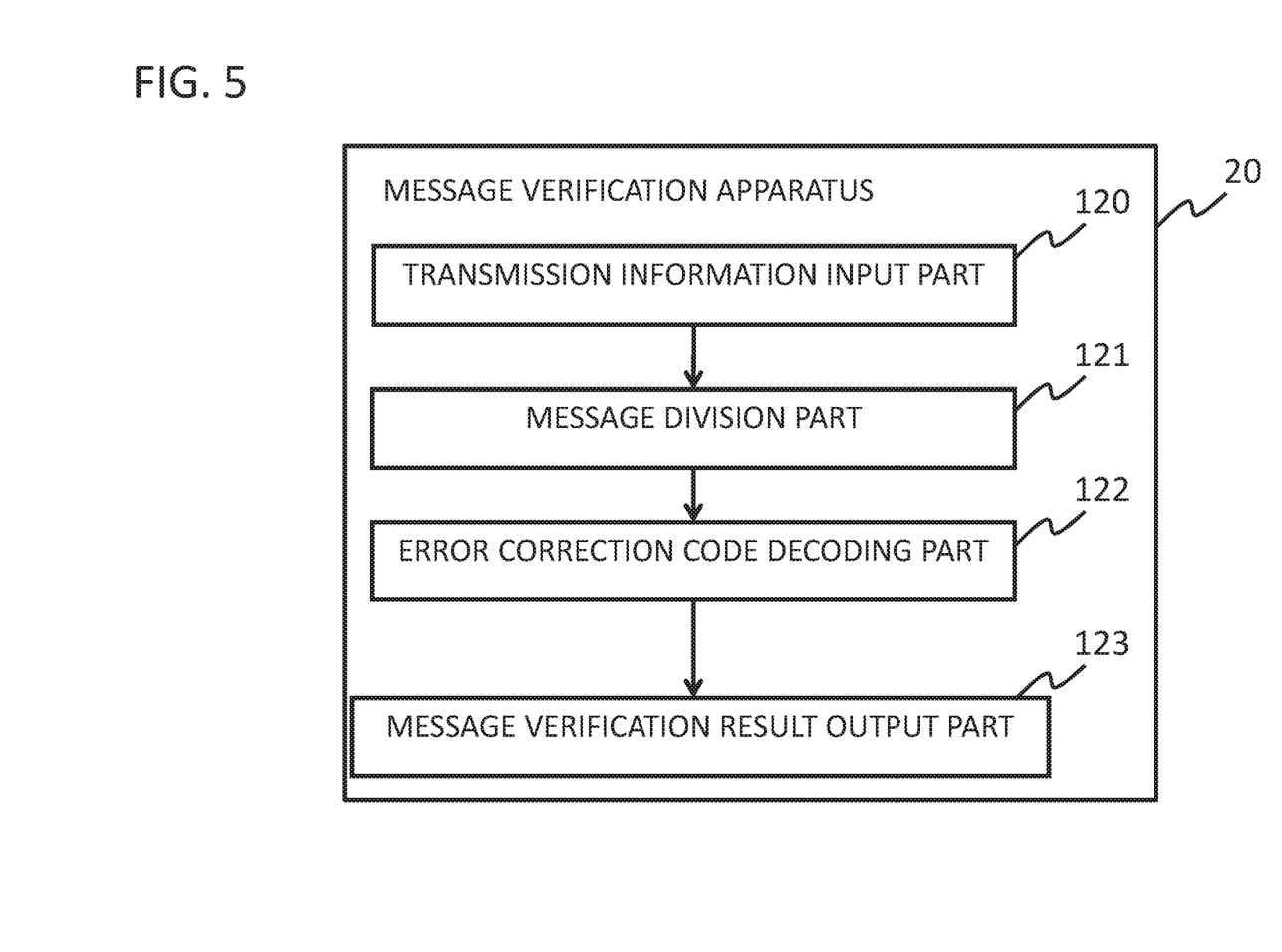
FIG. 5 is a drawing illustrating the configuration of a message verification apparatus according to the first exemplary embodiment of the present disclosure.

Next, the configuration of the message verification apparatus 20 will be described. FIG. 5 is a block diagram showing the configuration of the message verification apparatus 20. FIG. 5 shows a configuration comprising a transmission information input part 120, a message division part 121, an error correction code decoding part 122, and a message verification result output part 123.

The transmission information input part 120 receives the transmission information S transmitted from the message transmission apparatus 10. The transmission information input part 120 is realized by a communication unit that receives a message from the outside (for instance refer to the communication device 930 and the input device 940 in FIG. 9).

The message division part 121 corresponds to the extraction part above, dividing the transmission information S to obtain the codeword C' and the tag T' received.

The correction code decoding part 122 applies a decoding function of the error correction code to the codeword C' obtained by the message division part 121 and outputs the message M* as the decoding result. Here, if there is no tampering during the communication of the received codeword C' and an error occurred in the communication is within the correction capability of the error correction code used, M* will match the original message M. When the decoding function is $g^{-1}(x)$, the mathematical formula of M* can be expressed as $g^{-1}(C')$.

The message verification result output part 123 calculates F(M*) for the message M* (the decoding result) using the tag generation function F(x), the same message authentication code as the message transmission apparatus 10, and obtains the local tag T*. Then the message verification result output part 123 compares the tag T* with the received tag T', and determines that there has been tampering if the distance therebetween (a value indicating the amount of the difference between the tag T* and the tag T') exceeds a threshold value expected from the noise of the communication channel. If not, it determines that there has been no tampering. The message verification result output part 123 outputs the result of the above judgment to a display, etc. The distance described above depends on the nature of the communication channel. For instance, if it is a normal binary symmetric channel, the Hamming distance may be used. The threshold value depends on the noise parameters.

As the message transmission apparatus 10, the message verification apparatus 20 described above can also be realized by a computer comprising a CPU and a storage device (memory/disk) (refer to FIG. 9). Further, as shown in FIG. 9, each part of the message verification apparatus 20 described above can be realized by storing in the storage device 920 a computer program that causes the CPU 910 to execute processes corresponding to each of the parts above (refer to the program storage part 922 in FIG. 9) and by running this program on the CPU 910.

Figure 6:
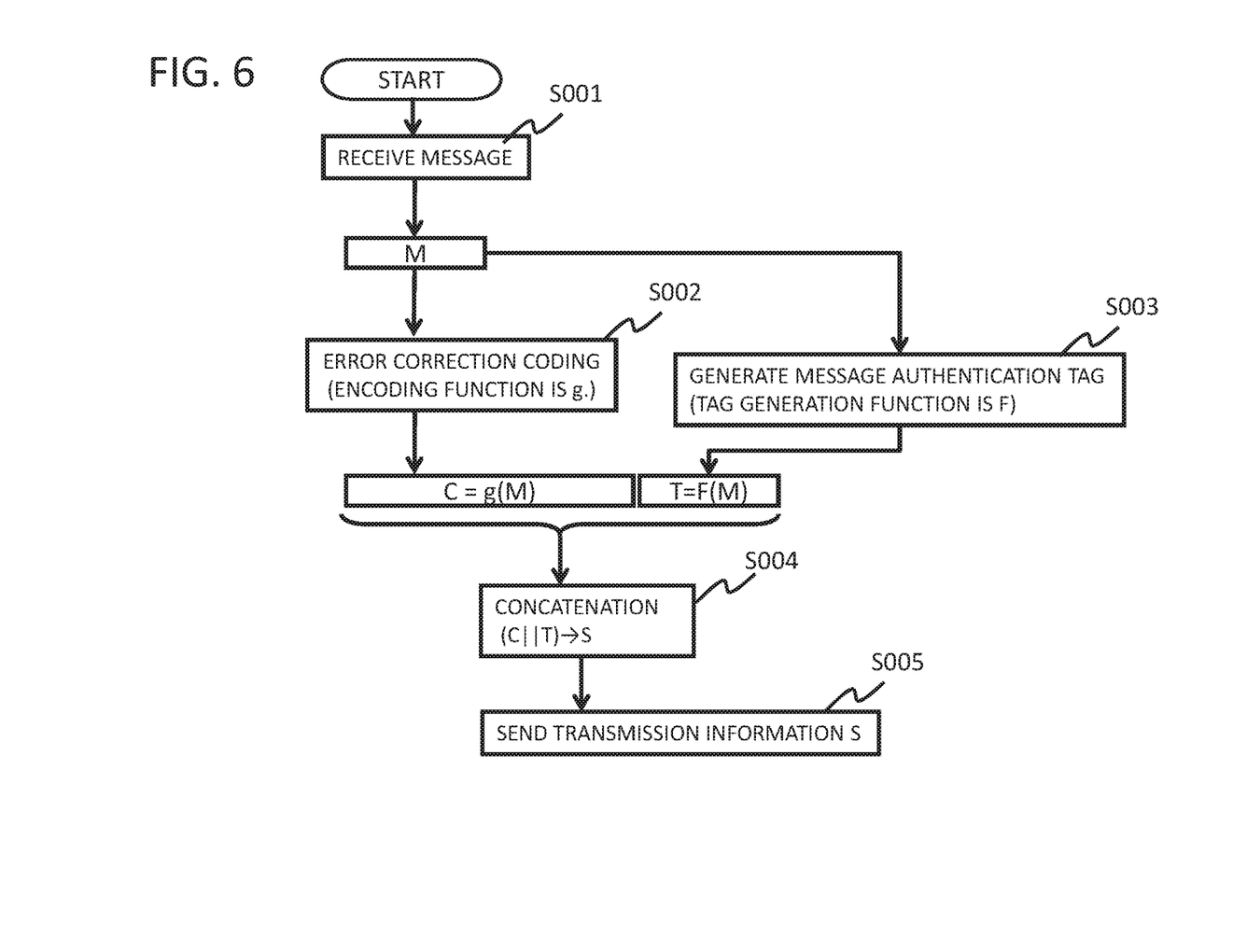
FIG. 6 is a flowchart showing the operation of the message transmission apparatus according to the first exemplary embodiment of the present disclosure.

Next, the operation of the present exemplary embodiment will be described in detail with reference to the drawings. FIG. 6 is a flowchart showing the operation of the message transmission apparatus according to the first exemplary embodiment of the present disclosure. As shown in FIG. 6, the message input part 110 of the message transmission apparatus 10 first receives the message M to be processed (step S001 in FIG. 6).

Next, the error correction coding part 111 of the message transmission apparatus 10 encodes the message M and outputs the codeword C (step S002 in FIG. 6).

Next, the message authentication tag generation part 112 of the message transmission apparatus 10 calculates the tag T by applying the tag generation function of the message authentication code to the message M and outputs the tag T (step S003 in FIG. 6).

The output part 113 of the message transmission apparatus 10 concatenates the codeword C and the tag T to create the transmission information S (step S004 in FIG. 6). The transmission information S is constituted by g(M)||F(M)= C||T, as shown in FIG. 6.

Finally, the message transmission apparatus 10 transmits the created transmission information S to the message verification apparatus 20 (step S005 in FIG. 6).

Figure 7:
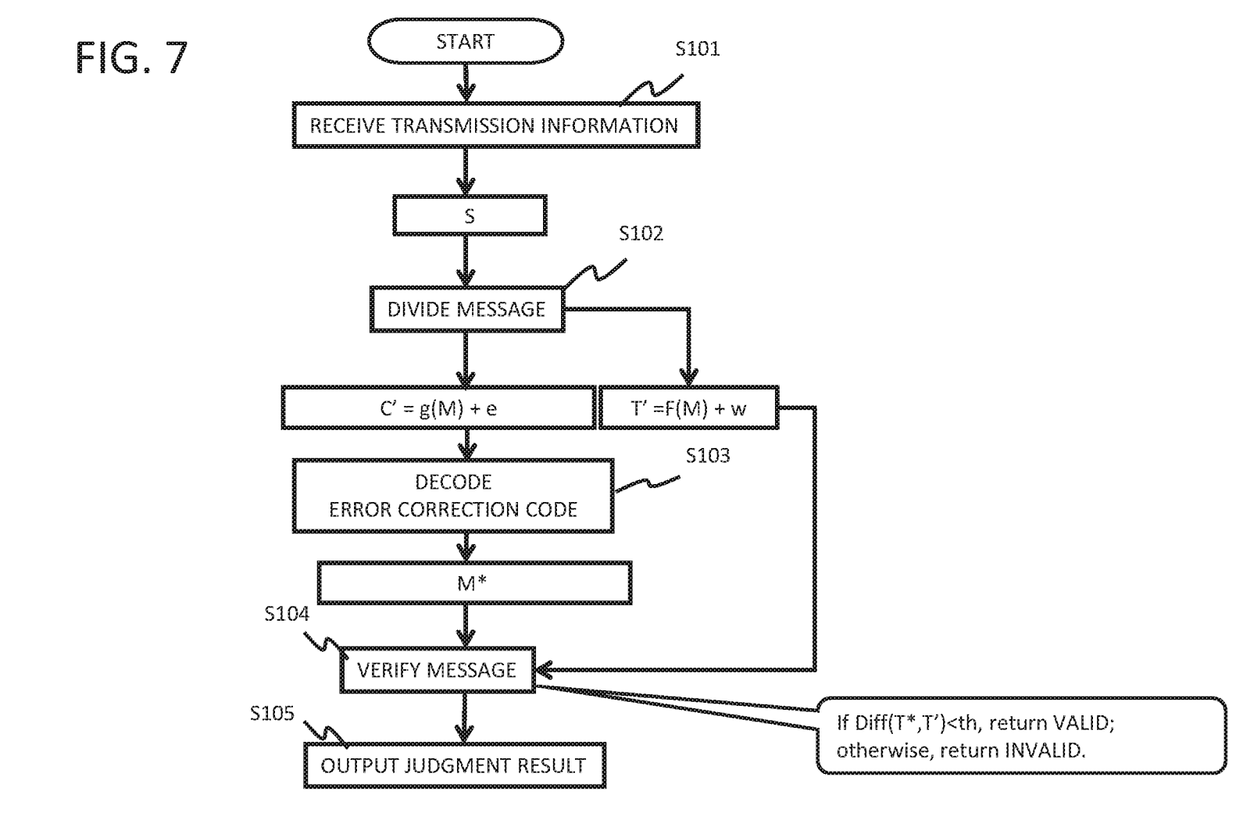
FIG. 7 is a flowchart showing the operation of the message verification apparatus according to the first exemplary embodiment of the present disclosure.

FIG. 7 is a flowchart showing the operation of the message verification apparatus according to the first exemplary embodiment of the present disclosure. As shown in FIG. 7, the transmission information input part 120 of the message verification apparatus 20 first receives the transmission information S to be verified (step S101 in FIG. 7).

Next, the message division part 121 of the message verification apparatus 20 extracts the codeword C' and the received tag T' from the transmission information S (step S102 in FIG. 7). The message division part 121 sends the codeword C to the error correction code decoding part 122.

Next, the error correction code decoding part 122 of the message verification apparatus 20 decodes the error correction code for the codeword C' and outputs the message M* as the decoding result (step S103 in FIG. 7).

Next, the message verification result output part 123 of the message verification apparatus 20 applies the tag generation function of the message authentication code to the message M*, which is the decoding result, and obtains the local tag T*. Then the message verification result output part 123 compares the local tag T* with the received tag T' (step S104 in FIG. 7).

The message verification result output part 123 determines that there has been tampering (INVALID) when the distance between the tag T* and the tag' is not less than the predetermined threshold value th as a result of the comparison (Diff (T*, T')≥th), and when it is, the message verification result output part 123 determines that there has been no tampering (VALID) and outputs the judgment result (step S105 in FIG. 7).

As described above, according to the present exemplary embodiment, in communication in which both a message authentication code and an error correction code are applied, the process order of tag creation for message authentication and error correction coding by the transmission side can be arbitrarily changed. Further, according to the present exemplary embodiment, it is also possible to execute tag creation and error correction coding in parallel (a first effect). The reason for this is that tag creation for message authentication and error correction coding are applied to a message independently. As shown in the upper part of FIG. 8, in comparison with the method of Patent Literature 1 that needs to create a tag for message authentication first, this point is a great advantage in improving the processing speed and reducing the amount of calculation and the data size.

Meanwhile, the receiving side of the present exemplary embodiment first performs error correction on a message and then verifies the message by comparing the tag T* calculated as a result of the error correction with the received tag T'. Here, since no error correction code is applied to the transmitted tag T', channel noise is expected to be added thereto. For this reason, if strict match judgment is performed as in a normal message authentication code, in many cases, the verification result will be determined as invalid (determined that there has been tampering). In the present exemplary embodiment, a message is verified by determining that the message M* has been tampered with only when the value indicating the amount of the difference between the calculated tag T* and the received tag T' (for instance, the Hamming distance) is equal to or greater than the value expected from the error rate of the communication channel.

The judgment based on a threshold value described above weakens the acceptance criteria of a message authentication code. It is important to note that a message authentication code is generally made of a pseudorandom function (PRF), and a PRF output is completely random for different inputs (more accurately, a pseudorandom number that cannot be computationally discriminated from a perfect random number).

Therefore, when a tag is t bits and the noise occurring in the tag is r bits on average from the error rate of the communication channel, the probability of successful tampering increases by only at most $2^r$ times even if the acceptance criteria of the message authentication code is weakened as mentioned above.

In a typical example, when t=64 and the error rate is 0.08, approximately 5 bits are added as noise on average, however, even in this case, the probability of successful tampering with the original message authentication code is $2^{-64}$. Meanwhile, the probability of successful tampering in the present disclosure is only $2^{-59}$.

Figure 8:
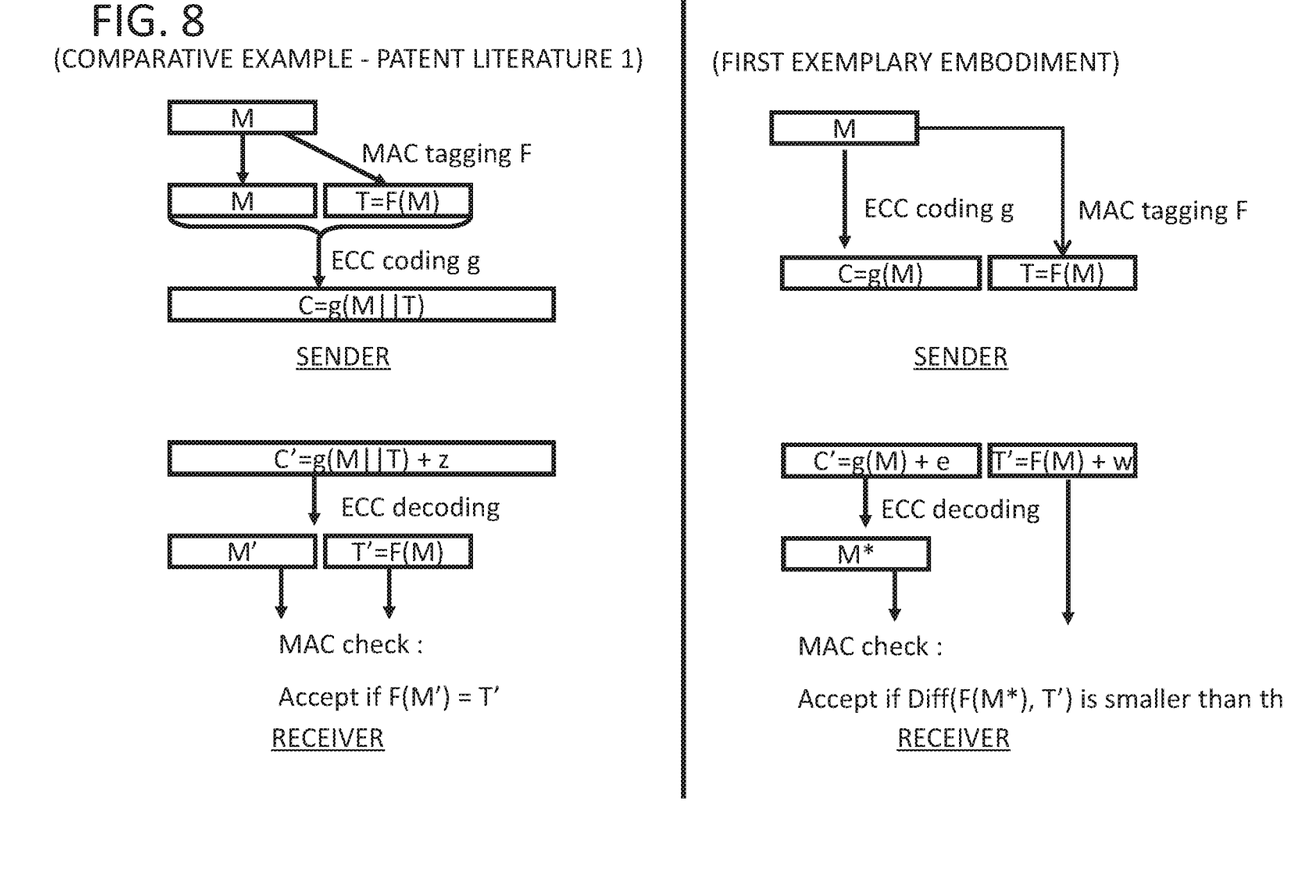
FIG. 8 is a reference diagram for explaining the difference between a comparative example and the message authentication system according to the first exemplary embodiment of the present disclosure.

Further, according to the present exemplary embodiment, the size of transmitted data and the amount of calculation can be reduced due to a narrowed application range of the error correction code. FIG. 8 is a diagram comparing the message authentication method of Patent Literature 1 shown as a comparative example with the message authentication method of the first exemplary embodiment. As shown in FIG. 8, in the case of the comparative example, the error correction code (ECC) is applied to the message authentication tag T and the message M, and the tags are verified with exact match determination. Meanwhile in the present exemplary embodiment, only the message is subject to the error correction code (ECC), and the tags are checked by looking at the distance criterion Diff (F(M*), T') between two tags and the threshold value th. Let us assume that the message M has m bits and the tag T has t bits in FIG. 8. For instance, when m=t=64, since error correction is applied to 128-bit (M, T), in which both are concatenated, in the method of the comparative example (corresponding to Patent Literature 1), 256 bits are transmitted with a simple repetition code. The present exemplary embodiment can compress this to 192 bits (=128+64) since error correction is applied only to the message M.

In general, the effect of bandwidth reduction (transmitted data compression) decreases as the error correction code rate used is closer to optimal (i.e., closer to a perfect code), however, according to the present exemplary embodiment, the effect does not disappear even with a perfect code. For instance, a case of using a Hamming code, a perfect code capable of 1-bit error correction, will be discussed. In order to perform 1-bit error correction using a Hamming code when m=57 and t=63, a (127, 120) Hamming code codeword will be transmitted (the increase is 127−(m+t)=7 bits) in the method of the comparative example (corresponding to Patent Literature 1) (n denotes the code length and k the message length in a (n, k) Hamming code). The present exemplary embodiment needs to transmit only 126 bits, in which a (63, 57) Hamming code codeword (the increase is 63−m=6 bits) and the tag T bits are concatenated, reducing the size by 1 bit.

As another example, in a case of m=4 and t=53 where the message is very short but one wants to maintain sufficient authentication strength, whereas a (63, 57) Hamming code codeword is transmitted in the comparative example (corresponding to Patent Literature 1), the present disclosure needs to transmit only 60 bits, in which a (7, 4) Hamming code codeword and the tag T bits are concatenated, reducing the size by 3 bits. Such an example corresponds to a case where only several bits of information are sent each time, such as alive monitoring by a sensor.

Further, according to the present exemplary embodiment, as these examples demonstrated, there is an effect of reducing the amount of calculation since the reduced input/output of the code decreases the overall amount of calculation.

Each exemplary embodiment of the present disclosure has been described, however, the present invention is not limited to these exemplary embodiments and further modifications, substitutions, and adjustments can be performed within the scope of the basic technological concept of the present invention. For instance, the number of apparatuses and connection configurations thereof, the configuration of each element, and the expression of messages shown in each drawing are examples to facilitate understanding of the present invention and are not limited to the configurations shown in the drawings.

Finally, preferred modes of the present invention will be summarized.

Mode 1

(Refer to the Message Authentication System According to the First aspect.)

Mode 2

The message verification result output means of the message authentication system described above may determine that the message M* to be verified has not been tampered with when a value indicating the amount of the difference between the tag T* and the tag T' is not greater than a predetermined threshold value.

Mode 3

In the message authentication system described above, the threshold value may be a value set according to a predetermined error rate expected in a communication channel between the first and the second apparatuses.

Mode 4

It is preferred that the message authentication system described above be configured such that the error correction coding process and the message authentication tag generation process are operated in parallel.

Mode 5

The first and the second apparatuses of the message authentication system described above may calculate the tag T and the tag T* using CMAC (Cipher-based Message Authentication Code), respectively.

Mode 6

The first and the second apparatuses of the message authentication system described above may calculate the tag T and tag T* using HMAC (Hash-based Message Authentication Code), respectively.

Mode 7

A second apparatus comprising:
an extraction part that extracts a codeword C' and a tag T' corresponding to a codeword C and a tag T from transmission information S received from a first apparatus that transmits the codeword C and the tag T as the transmission information S to the second apparatus;
an error correction code decoding part that decodes the predetermined error correction code for the codeword C' and outputs a message M* to be verified; and
a message verification result output part that receives the message M* to be verified and the tag T', and determines that the message M* to be verified has not been tampered with when a tag T* obtained from the message M* to be verified and the tag T' satisfy a predetermined identity criterion.

Mode 8

A first apparatus comprising:
an error correction coding part that receives a message M to be transmitted to a second apparatus, performs coding using a predetermined error correction code, and outputs a codeword C;
a message authentication tag generation part that receives the message M and outputs a predetermined message authentication tag T; and
a transmission part that transmits the codeword C and the tag T as transmission information S to the second apparatus.

Mode 9

(Refer to the Message Verification Method According to the Third Aspect.)

Mode 10

A program causing a computer built into a second apparatus to execute:
a process of extracting a codeword C' and a tag T' corresponding to a codeword C and a tag T from transmission information S received from a first apparatus that transmits the codeword C and the tag T as the transmission information S to the second apparatus;
a process of decoding a predetermined error correction code for the codeword C' and outputting a message M* to be verified; and
a process of receiving the message M* to be verified and the tag T', and determining that the decoded message M* has not been tampered with when a tag T* obtained from the message M* to be verified and the tag T' satisfy a predetermined identity criterion.

Note that Modes 7 to 10 can be developed into Modes 2 to 6 as Mode 1.

Further, each disclosure of Patent Literature and Non-Patent Literatures cited above is incorporated herein in its entirety by reference thereto. It is to be noted that it is possible to modify or adjust the exemplary embodiments or examples within the whole disclosure of the present invention (including the Claims) and based on the basic technical concept thereof. Further, it is possible to variously combine or select a wide variety of the disclosed elements (including the individual elements of the individual claims, the individual elements of the individual exemplary embodiments or examples and the individual elements of the individual figures) within the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

The present invention is applicable to error correction and message authentication in wireless or wired data communication, and as a specific application, it can be applied to applications such as securing data integrity for communication between a wireless sensor device and an information collection server.

REFERENCE SIGNS LIST

10: message transmission apparatus
20: message verification apparatus
100: first apparatus
101, 111: error correction coding part
102, 112: message authentication tag generation part
103: transmission part
110: message input part
113: output part
120: transmission information input part
121: message division part
200: second apparatus
201: extraction part
202, 122: error correction code decoding part
203, 123: message verification result output part
910: CPU
920: storage device
921: threshold value storage part
922: program storage part
930: communication device
940: input device
950: output device

The invention claimed is:
1. A message authentication system including:
a first apparatus comprising:
a hardware processor configured to execute program instructions to:
receive a message M to be transmitted to a second apparatus, perform coding of the message M using a predetermined error correction code, and output a codeword C;
output a predetermined message authentication tag T using the message M as received; and
transmit the codeword C and the predetermined message authentication tag T as transmission information S to the second apparatus; and
the second apparatus comprising:
a hardware processor configured to execute program instructions to:
extract a codeword C' and a tag T' corresponding to the codeword C and the predetermined message authentication tag T from the transmission information S received from the first apparatus;
decode the predetermined error correction code for the codeword C' and output a message M*, as a decoding result, to be verified; and
receive the message M* to be verified and the tag T', and determine that the message M* to be verified has not been tampered with when a tag T* obtained from the message M* to be verified and the tag T' satisfy a predetermined identity criterion, and wherein the message authentication system is configured such that the performing coding of the message M using the predetermined error correction code and the outputting of the predetermined message authentication tag T using the message M as received are performed in parallel.

2. The message authentication system according to claim 1, wherein the hardware processor of the second apparatus is further configured to execute program instructions to determine that the message M* to be verified has not been tampered with when a value indicating an amount of a difference between the tag T* and the tag T' is not greater than a predetermined threshold value.

3. The message authentication system according to claim 2, wherein the threshold value is a value set according to a predetermined error rate expected in a communication channel between the first and the second apparatuses.

4. The message authentication system according to claim 3, wherein the first and the second apparatuses calculate the tag T and the tag T* using CMAC (Cipher-based Message Authentication Code), respectively.

5. The message authentication system according to claim 3, wherein the first and the second apparatuses calculate the tag T and tag T* using HMAC (Hash-based Message Authentication Code), respectively.

6. The message authentication system according to claim 2, wherein the first and the second apparatuses calculate the tag T and the tag T* using CMAC (Cipher-based Message Authentication Code), respectively.

7. The message authentication system according to claim 2, wherein the first and the second apparatuses calculate the tag T and tag T* using HMAC (Hash-based Message Authentication Code), respectively.

8. The message authentication system according to claim 1, wherein the first and the second apparatuses calculate the tag T and the tag T* using CMAC (Cipher-based Message Authentication Code), respectively.

9. The message authentication system according to claim 1, wherein the first and the second apparatuses calculate the tag T and tag T* using HMAC (Hash-based Message Authentication Code), respectively.

* * * * *